United States Patent
Becker et al.

(10) Patent No.: US 7,798,072 B2
(45) Date of Patent: Sep. 21, 2010

(54) STOWABLE TABLE ASSEMBLY WITH A TABLETOP LOCKING MECHANISM

(75) Inventors: Howard B. Becker, Malibu, CA (US); Ronald T. Weaver, Tujunga, CA (US)

(73) Assignee: Becker Automotive Design, Inc., Oxnard, CA (US)

( * ) Notice: Subject to any disclaimer, the term of this patent is extended or adjusted under 35 U.S.C. 154(b) by 1070 days.

(21) Appl. No.: 11/370,154

(22) Filed: Mar. 6, 2006

(65) Prior Publication Data

US 2006/0220425 A1 Oct. 5, 2006

Related U.S. Application Data

(60) Provisional application No. 60/667,504, filed on Mar. 31, 2005.

(51) Int. Cl.
A47B 23/00 (2006.01)
A47B 37/00 (2006.01)

(52) U.S. Cl. .......................... 108/42; 297/145; 297/161

(58) Field of Classification Search .................. 108/42, 108/44, 166, 167, 171; 297/135, 145, 155, 297/162, 149, 150, 154, 161, 195, 188.1, 297/188.02, 188.11, 188.14, 188.15, 188.21, 297/188.16; 16/230, 231, 258, 371
See application file for complete search history.

(56) References Cited

U.S. PATENT DOCUMENTS 3,632,161 A * 1/1972 Arfaras et al. ............... 297/145
4,852,940 A    8/1989 Kanigowski ................. 297/145
4,944,552 A    7/1990 Harris ........................ 297/145
5,547,247 A *  8/1996 Dixon ......................... 297/145
6,220,658 B1 * 4/2001 Lukawski et al. ........... 297/145
6,347,590 B1 * 2/2002 D'Annunzio et al. ......... 108/44
6,427,957 B1 * 8/2002 Finneman et al. ......... 248/185.1
7,311,354 B2 * 12/2007 Giasson ...................... 297/161
7,478,868 B2 * 1/2009 Figueras Mitjans ......... 297/162
2005/0045071 A1 * 3/2005 Lindstrom et al. ............ 108/44
2008/0197678 A1 * 8/2008 Olarte ......................... 297/162

* cited by examiner

Primary Examiner—Darnell M Jayne
Assistant Examiner—Timothy M Ayres
(74) Attorney, Agent, or Firm—Koppel, Patrick, Heybl & Dawson

(57) ABSTRACT

A stowable table assembly comprising a hinge block, a tabletop, and a support carrying the tabletop. The support is pivotably attached to the hinge block for rotation about a hinge axis. The tabletop is thereby rotatable about the hinge axis between a use position and a stowing position. The tabletop is furthermore movable relative to the support. A releasable locking mechanism associated with the hinge block and the support prevents rotation of the tabletop unless the tabletop is in a predetermined position relative to the support. The locking mechanism is released in response to movement of the tabletop to the predetermined position thereby permitting the tabletop to be rotated toward its stowing position.

1 Claim, 6 Drawing Sheets

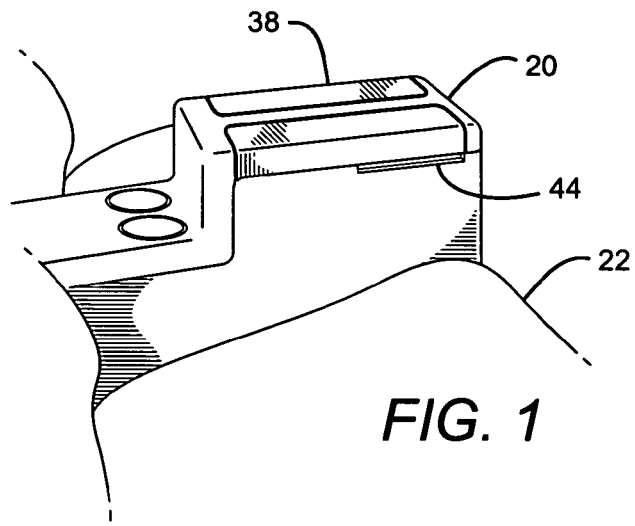
FIG. 1
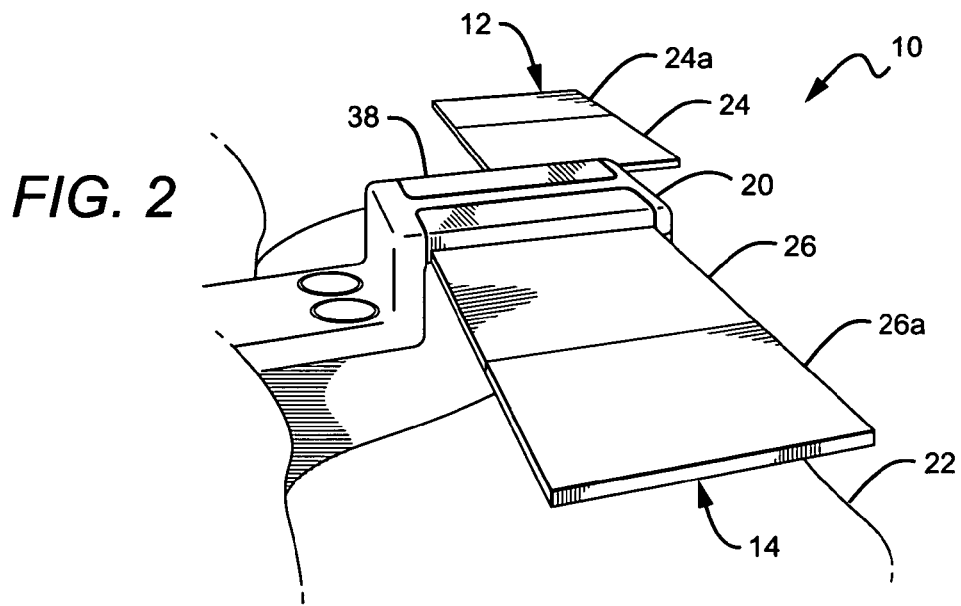
FIG. 2
FIG. 4
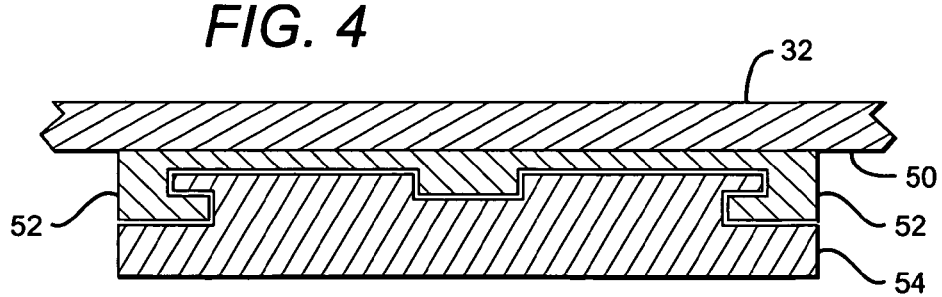

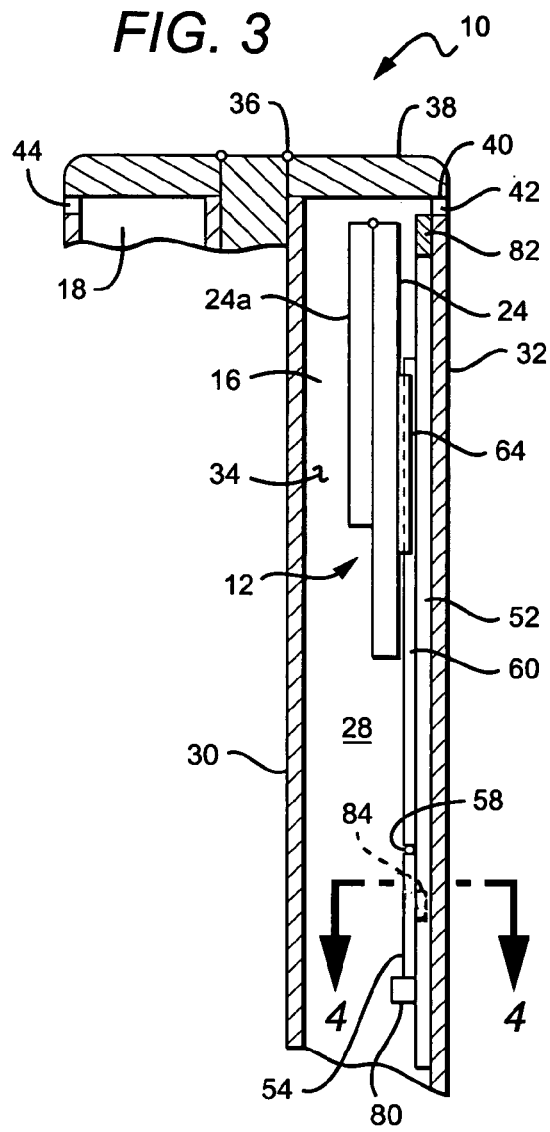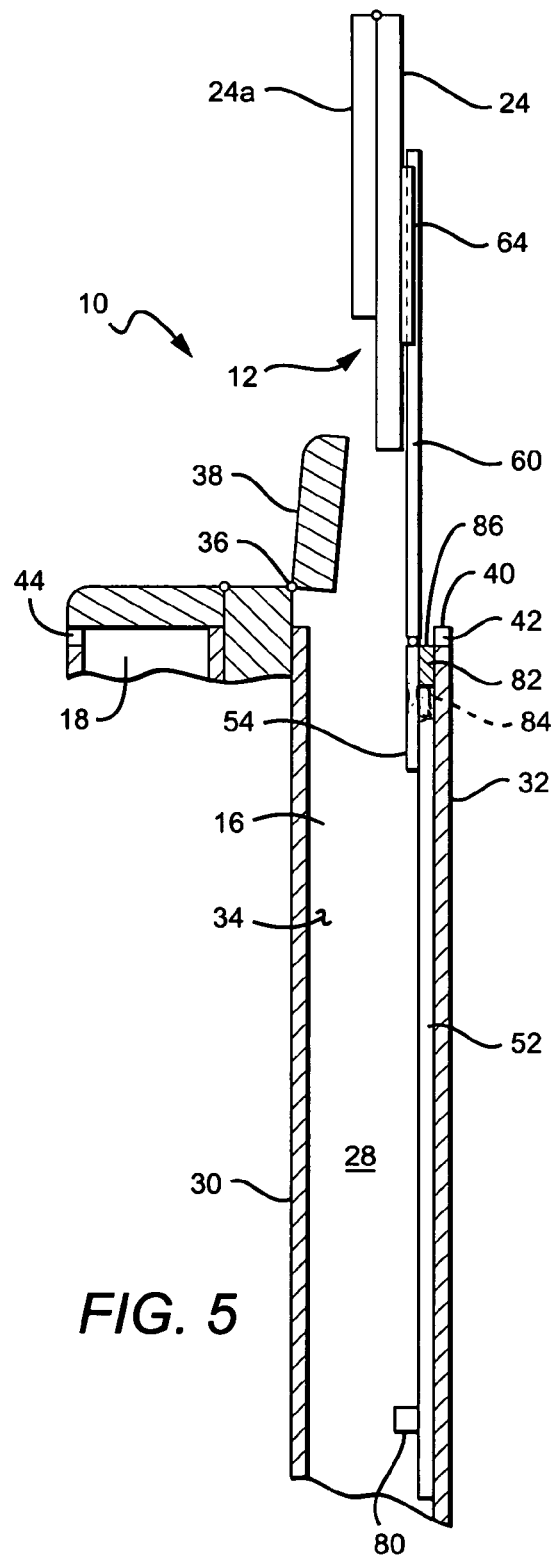

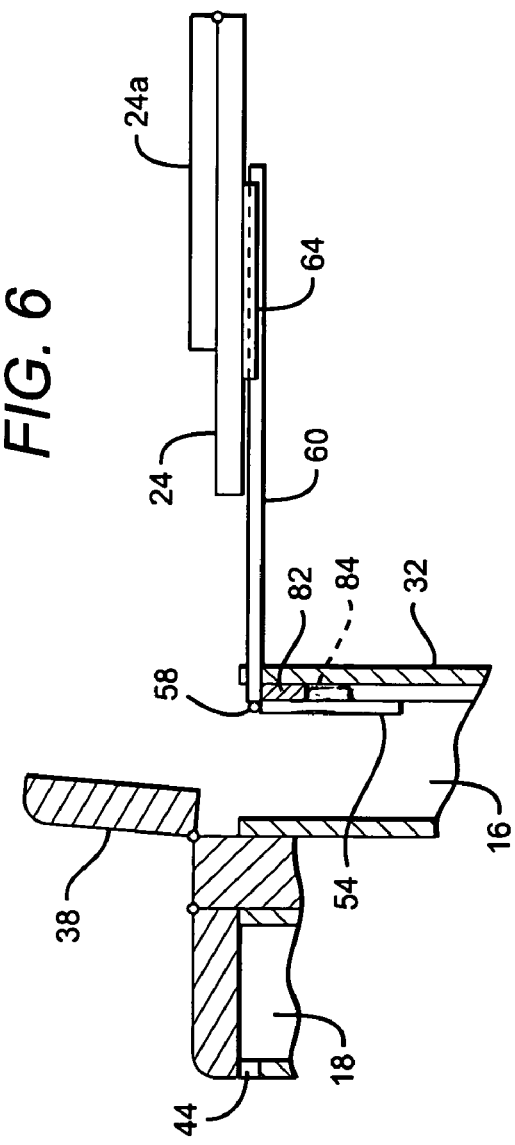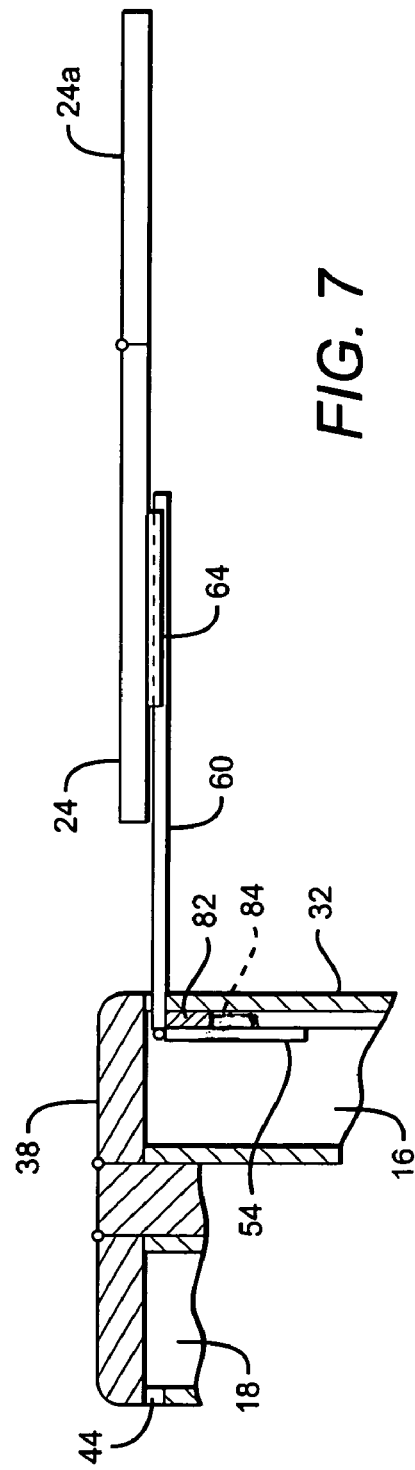

US 7,798,072 B2

STOWABLE TABLE ASSEMBLY WITH A TABLETOP LOCKING MECHANISM

CROSS REFERENCE TO RELATED APPLICATION

This application claims the benefit of U.S. Provisional Application No. 60/667,504 filed Mar. 31, 2005.

BACKGROUND OF THE INVENTION

1. Field of the Invention

The present invention relates generally to stowable table systems and particularly to a stowable table assembly that includes a tabletop deployable to a horizontal position of use in which position the tabletop is prevented from being lifted for stowing unless the tabletop is in a proper fore-and-aft position.

2. Description of the Related Art

The tabletops of table assemblies of the kind that are stowable in a storage compartment formed, for example, in the armrest of a seat, are typically mounted for pivotal movement about a hinge to a horizontal position of use. The tabletop may then be moved fore-and-aft to a comfortable position of use. To stow the table assembly, the tabletop must first be moved to a predetermined fore-and-aft position to allow the tabletop to be pivoted upwardly to a vertical position. The table assembly can then be slid down into the storage compartment. Failure to properly position the tabletop in the fore-and-aft direction before lifting the table can result in interference between the tabletop and the compartment structure when an attempt is made to lift the tabletop. Such interference may cause damage to the compartment structure and/or the table assembly.

SUMMARY OF THE INVENTION

In accordance with one specific exemplary embodiment of the invention, there is provided a table assembly adapted to be stowed within a compartment. The table assembly comprises a hinge block, a tabletop, and a support carrying the tabletop, the support being pivotally attached to the hinge block for rotation about a hinge axis. The tabletop is thereby rotatable about the hinge axis between a use position and a stowing position. The tabletop is furthermore movable relative to the support. A releasable locking mechanism operatively associated with the hinge block and the support prevents rotation of the tabletop unless the tabletop is in a predetermined position relative to the support, the locking mechanism being released in response to movement of the tabletop to the predetermined position thereby permitting the tabletop to be rotated toward its stowing position.

Pursuant to another aspect of the invention, the releasable locking mechanism comprises a lever having opposite ends. The lever is mounted on the support for pivoting about an axis positioned between the lever's ends. The hinge block is configured to receive one of the ends of the lever to prevent rotation of the support relative to the hinge block. The lever is rotatable about the pivot to move the one end of the lever to a released position relative to the hinge block in response to movement of the tabletop to the predetermined position, thereby permitting rotation of the tabletop toward the stowing position.

Further, the lever is resiliently biased toward the position of the lever in which it prevents rotation of the support relative to the hinge block.

In accordance with yet another aspect of the invention, the support and the hinge block define engageable surfaces for preventing the support from being rotated past the stowing position thereof.

BRIEF DESCRIPTION OF THE DRAWINGS

The foregoing and other objects, features and advantages of the invention will be evident to those skilled in the art from the detailed description, below, taken together with the accompanying drawings, in which:

FIG. 1 is a perspective view of a rear seat center console of a passenger vehicle, the console defining a pair of compartments each adapted to receive a stowable table assembly in accordance with one embodiment of the invention;

FIG. 2 is a perspective view of the console of FIG. 1 showing left and right tabletops of the stowable table assemblies in their deployed state, the left or driver side tabletop being shown in its forwardmost position and the right side tabletop being shown in its rearmost position;

FIG. 3 is a partial, vertical cross section view of the console shown in FIG. 1 illustrating one of the table assemblies in its stowed position within one of the console compartments;

FIG. 4 is a cross section view as seen along the line 4-4 in FIG. 3;

FIG. 5 is a partial, vertical cross section view showing the table assembly of FIG. 3 withdrawn from its compartment to an uppermost position;

FIG. 6 is a vertical cross section view showing the table assembly of FIG. 5 rotated to a horizontal position;

FIG. 7 is a vertical cross section view showing the table assembly of FIGS. 5 and 6 in its final position of use, with an outboard section of the tabletop folded out;

DETAILED DESCRIPTION OF THE INVENTION

Figure 8:
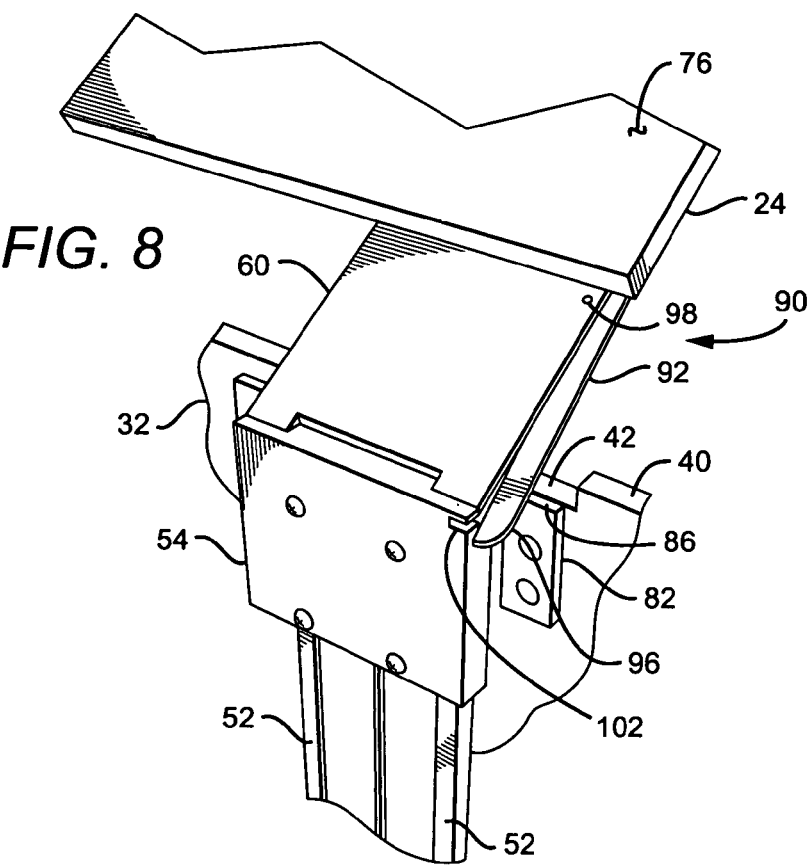
FIG. 8 is a perspective view of the table assembly of the invention showing details of a releasable locking mechanism forming part of the invention, the latching mechanism being shown in its released state with the table assembly shown in a position intermediate the vertical and horizontal positions.
Figure 9:
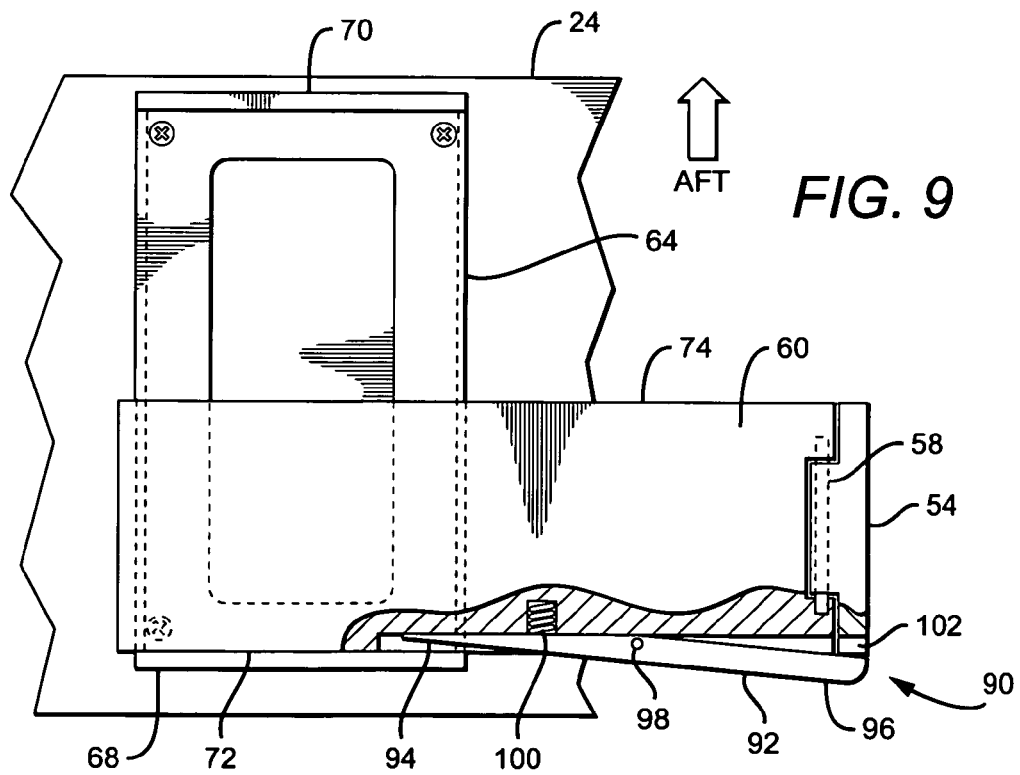
FIG. 9 is a bottom plan view, partly in cross section, of a portion of the table assembly of the invention showing the latching mechanism in its released state.
Figure 10:
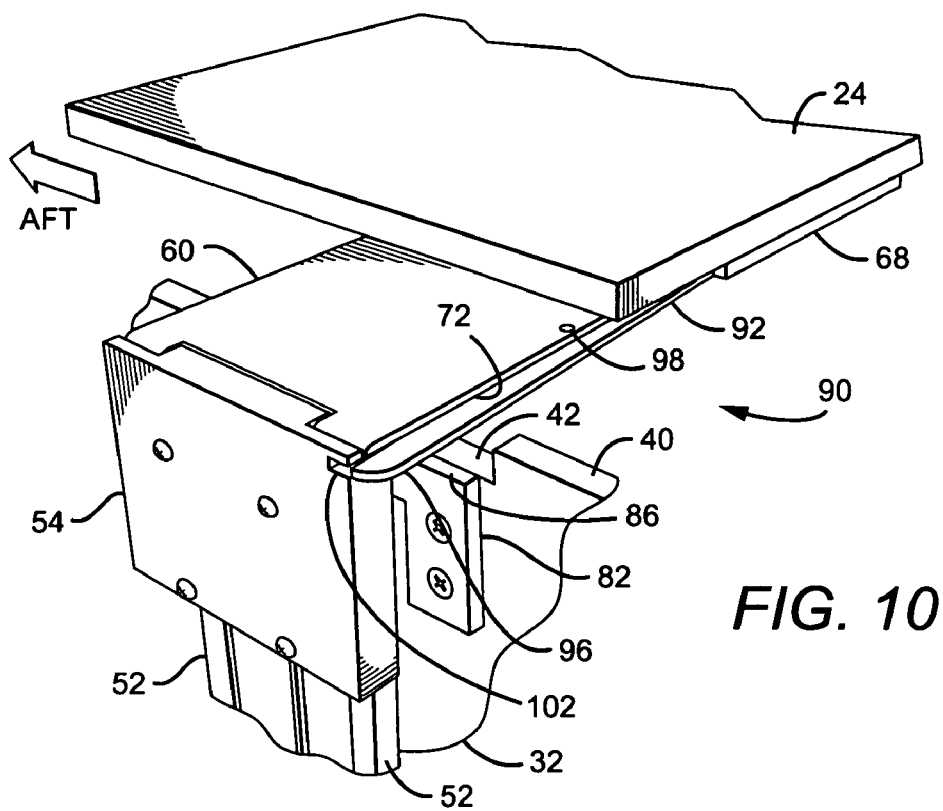
FIG. 10 is a perspective view of the table assembly of the invention showing the locking mechanism in its released state.
Figure 11:
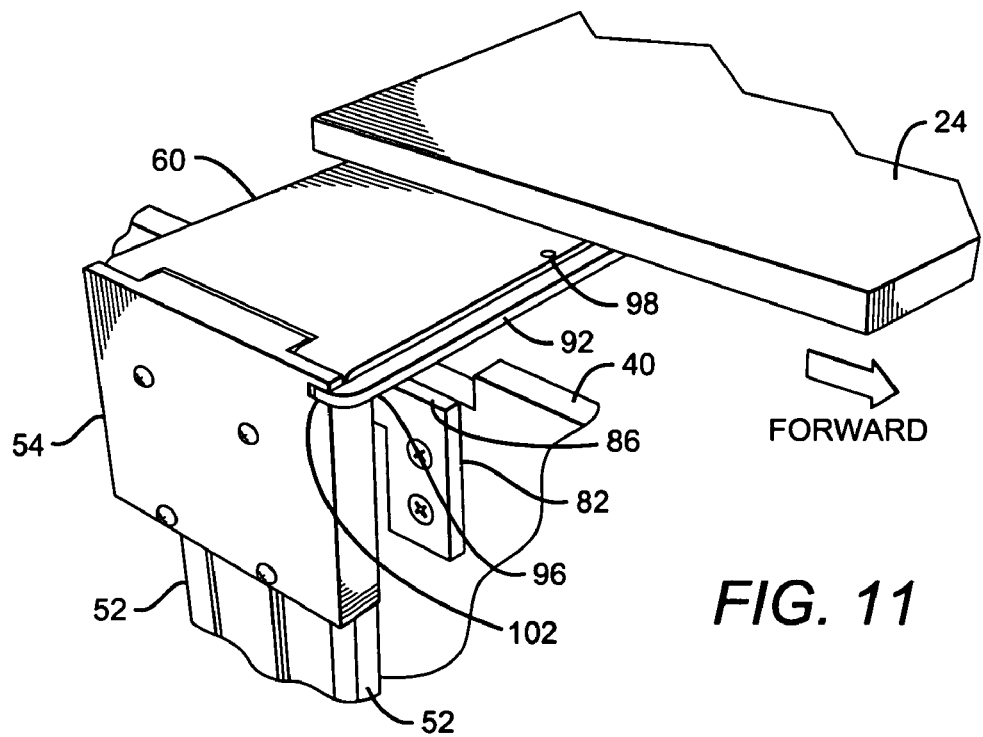
FIG. 11 is a perspective of the table assembly of the invention showing the locking mechanism in its locked state.
Figure 12:
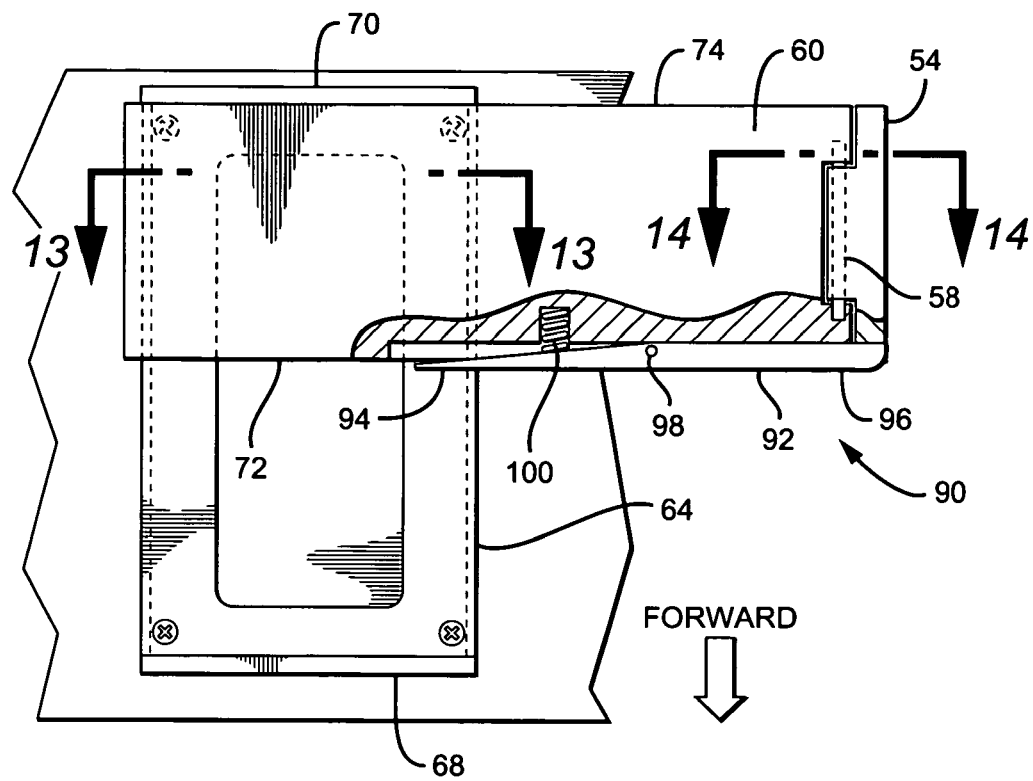
FIG. 12 is a bottom plan view, partly in cross section, of the table assembly of the invention showing the locking mechanism in its locked state.

It will be evident that the present invention has wide utility, being usable in any environment in which a stowable table system may be advantageously employed including, without limitation, aircraft; automotive vehicles such as vans, motor homes, recreational vehicles, sport-utility vehicles and limousines; and non-vehicle or stationary environments such as home theaters.

Referring to the drawings, there is shown a preferred, exemplary embodiment of the invention comprising a stowable table system 10 including a pair of deployable table assemblies 12 and 14 adapted to be received by, and deployed from, a corresponding pair of compartments 16 and 18 formed in a central armrest or console 20 of the rear seat 22 of an automotive vehicle. As suggested earlier, this environment is exemplary only. For example, instead of a pair of table assemblies associated with a central, rear seat console, only a single table assembly, stowable in a central front or rear seat console or armrest or in a front or rear seat side armrest, may be provided. The table assemblies include tabletops 24 and 26 deployable to the horizontal positions of use shown in FIG. 2. The tabletops 24 and 26 include hinged outboard sections 24a and 24b that may be folded out to extend the lengths of the tabletops.

Since the deployable table assemblies are identical except for their left- and right-handedness, by way of example, only the left side (driver's side) assembly 12 associated with the compartment 16 will be described in detail.

The compartment 16 comprises an interior space 28 sufficiently large to receive the entire table assembly 12 in its stowed state. The compartment space 28 is defined by parallel, spaced-apart, inboard and outboard sidewalls 30 and 32, respectively, and parallel, spaced-apart transversely-oriented front and rear walls, the rear wall 34 being seen in FIGS. 3 and 5-7. The inboard sidewall 30 of the compartment 16 has an upper edge to which is attached a longitudinal (fore-and-aft directed) hinge 36 supporting a compartment cover 38 which, when swung open (FIG. 5), provides access to the interior space 28 of the compartment. A forward portion of an upper edge 40 of the outboard sidewall 32 of the compartment 16 defines a recess 42 to accommodate structural elements of the table assembly 12 when deployed, as will be described below. A corresponding recess 44 associated with the right side of the console is shown in FIG. 1.

Fixedly secured to an interior surface 50 of the outboard sidewall 32 is a pair of parallel, spaced-apart, vertical guide rails 52 carrying a hinge block 54 movable vertically along the rails. Pivotally coupled to an upper end 56 of the hinge block 54 by means of a hinge pin 58 is a tabletop support 60. The tabletop support 60 includes longitudinal tracks 62 for carrying a bracket 64 that is slidable along the tracks 62 in a fore-and-aft direction.

The tabletop 24 is fixedly secured to the bracket 64 so that in its horizontal, deployed state, the tabletop may be moved fore-and-aft, that is, longitudinally, between limit positions defined by front and rear flanges 68 and 70, respectively, depending from the bracket that engage front and rear edges 72 and 74, respectively, of the tabletop support 60. The tabletop 24 has an upper, readily cleanable surface 76 for supporting user paraphernalia, for example, a laptop computer, writing and/or drawing equipment, food, beverages, and so forth.

A stop 80 adjacent to the lower extremity of the guide rails 52 is positioned to be engaged by the hinge block 54 to limit the downward movement of the hinge block. Similarly, an abutment 82 adjacent to the upper extremity of the guide rails 52 is positioned to be engaged by a lug 84 projecting from the hinge block to limit the upward movement of the hinge block.

The table assembly 12 is pulled up and withdrawn from the compartment 16 by means of a handle (not shown) attached to the table assembly. When the lug 84 on the hinge block 54 contacts the abutment 82, the tabletop 66 may then be rotated downwardly about the hinge pin 58 to the tabletop's horizontal orientation. (FIGS. 6 and 7.) The abutment 82 has an upper surface 86 for engagement by the tabletop support 60 when the tabletop is lowered to its horizontal orientation. It will be seen in FIGS. 6, 7, 10 and 11 that in the horizontal position of the tabletop, the tabletop support 60 is received within the recess 42 in the upper edge of the outboard sidewall 32.

The tabletop 24, after being lowered to its horizontal position, may then be slid by the user to a comfortable fore-and-aft position (FIG. 2). To re-stow the table assembly 12, the assembly must be first restored to its rearmost position in order for the table assembly to be pivoted upwardly without striking and perhaps damaging the console or table assembly structure. A feature of the present invention prevents such structural interference. Specifically, there is provided a releasable locking mechanism 90 (FIGS. 8-12) that is automatically actuated to prevent the tabletop 24 from being lifted unless the tabletop is in the proper fore-and-aft position. The locking mechanism 90 is automatically released in response to movement of the tabletop to a predetermined fore-and-aft position in which the tabletop may be safely lifted and rotated to a vertical orientation for stowing.

Figure 14:
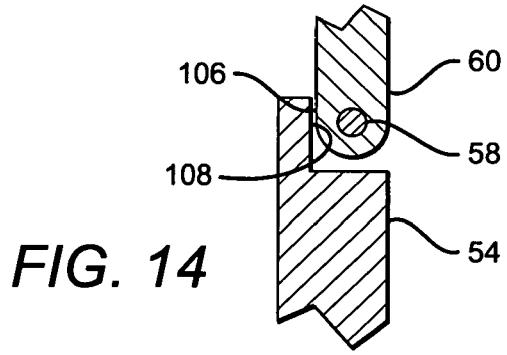
FIG. 14 is a cross section view as seen along the line 14-14 in FIG. 12 of portions of the table assembly hinge block and support with the support shown in its vertical position relative to the hinge block.
Figure 13:
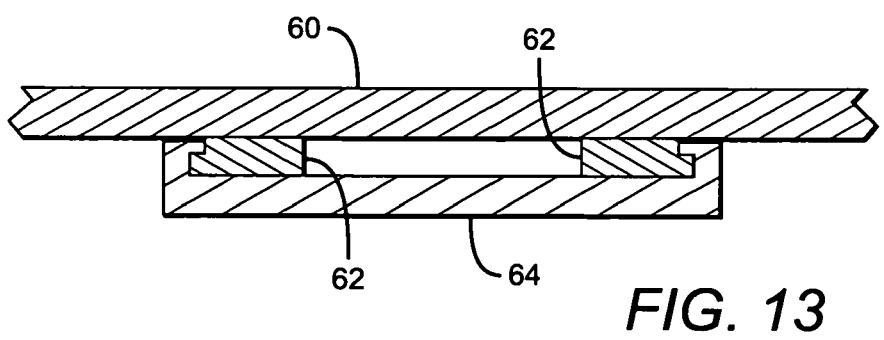
FIG. 13 is a cross section view as seen along the line 13-13 in FIG. 12.

More specifically, with reference to FIGS. 8-13, in accordance to a preferred embodiment of the invention, the releasable locking mechanism 90 comprises a lever 92 carried along the front edge 72 of the tabletop support 60. The lever 92 has an outboard end 94 and an inboard end 96. The lever 92 is pivotably mounted on the tabletop support 60 by means of a pivot pin 98 passing through the lever between the ends thereof. A compression spring 100 carried by the support 60 normally biases the lever 92 to a locking position (FIG. 12) in which the inboard end 96 of the lever is received within a slot 102 defined by the hinge block 54 adjacent an upper edge 104 thereof. Upward rotation of the tabletop 66 relative to the hinge block 54 is thereby prevented in all fore-and-aft positions of the tabletop except in its rearmost position. When the tabletop 24 is moved to its rearmost position (FIGS. 8-10), the outboard end 94 of the lever 92 is engaged by the flange 68 depending from the bracket 64 so that the lever is rotated to move its inboard end 96 out of the slot 102 thereby releasing the support 60 to permit the tabletop to be rotated to its vertical position. Thus, only when the tabletop is in its rearmost position can it be safely lifted to a vertical position for stowing in the console compartment. With reference to FIG. 14, the tabletop support 60 and the hinge block 54 define stop or limit surfaces 106 and 108, respectively, that engage when the tabletop is in its vertical position thereby preventing rotation past that position.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A stowable table system comprising:
   a compartment defining an interior space;
   a hinge block within said compartment, said hinge block being vertically movable between a lower position and an upper position;
   a support hingedly attached to said hinge block, said support being pivotable about a hinge axis between a horizontal use position and a vertical stowing position;
   a tabletop mounted on said support for linear movement between first and second limit positions relative to said support;
   a releasable locking mechanism operatively associated with said hinge block and said support for preventing pivoting of the support from its horizontal use position, unless the tabletop is at its second limit position, the locking mechanism being automatically released in response to a sliding movement of the tabletop to its second limit position thereby permitting the tabletop to be lifted and rotated to its vertical stowing position for stowing in said compartment;

the locking mechanism further comprising a lever having opposite ends, said lever being mounted on said support for pivoting about an axis disposed between said ends, the hinge block being configured to receive one of the ends of the lever to prevent rotation of the support relative to the hinge block, said lever being rotatable about said pivot to move the one end of the lever to a released position relative to the hinge block in response to movement of the tabletop to its second position, thereby permitting rotation of said tabletop to the vertical position; and a bracket carrying the tabletop and defining a surface positioned to engage the other of the ends of the lever and to rotate the lever to release the one end thereof from said hinge block when said tabletop is moved to its second limit position, the bracket further comprising spaced apart flanges adapted to engage the support to limit the movement of the tabletop between said first and second limit positions, wherein one of the flanges on the bracket is positioned to engage the other end of the lever to pivot the lever to release the one end of the lever from the hinge block.

* * * * *